US012262194B2

(12) United States Patent
Tachi et al.

(10) Patent No.: US 12,262,194 B2
(45) Date of Patent: Mar. 25, 2025

(54) DYNAMIC ACOUSTIC CONTROL SYSTEMS AND METHODS

(71) Applicant: ALPS ALPINE CO., LTD., Tokyo (JP)

(72) Inventors: Ryosuke Tachi, Rochester Hills, MI (US); Taiji Karasawa, Rochester Hills, MI (US); Francesto Villamizar, Novi, MI (US)

(73) Assignee: ALPS ALPINE CO., LTD., Tokyo (JP)

( * ) Notice: Subject to any disclaimer, the term of this patent is extended or adjusted under 35 U.S.C. 154(b) by 290 days.

(21) Appl. No.: 17/949,063

(22) Filed: Sep. 20, 2022

(65) Prior Publication Data

US 2024/0098443 A1 Mar. 21, 2024

(51) Int. Cl.
*H04S 7/00* (2006.01)

(52) U.S. Cl.
CPC .................................... *H04S 7/303* (2013.01)

(58) Field of Classification Search
CPC ................................... H04S 7/303; H04S 7/30
USPC .......................................................... 381/303
See application file for complete search history.

(56) References Cited

U.S. PATENT DOCUMENTS

| | | | | |
|---|---|---|---|---|
| 10,721,521 B1 * | 7/2020 | Robinson | H04N 21/4394 | |
| 11,595,775 B2 * | 2/2023 | Robinson | H04R 5/04 | |
| 2006/0062398 A1 | 3/2006 | McKee Cooper et al. | | |
| 2007/0253564 A1 * | 11/2007 | Katayama | H04S 3/008 | 84/630 |
| 2013/0101137 A1 * | 4/2013 | Pedersen | H04S 7/301 | 381/103 |

(Continued)

FOREIGN PATENT DOCUMENTS

| | | | |
|---|---|---|---|
| CN | 103517199 A * | 1/2014 | H04R 5/00 |
| EP | 4344256 A1 * | 3/2024 | H04S 7/301 |
| JP | 4584416 B2 * | 11/2010 | H04S 3/02 |

OTHER PUBLICATIONS

Extended European Search Report received for European Application No. EP 23195621 as mailed Jan. 26, 2024 in 9 pages.

*Primary Examiner* — David L Ton

(74) *Attorney, Agent, or Firm* — Knobbe, Martens, Olson & Bear, LLP

(57) ABSTRACT

A surround sound entertainment system configured to determine a microphone position relative to a first loudspeaker, the system comprising: first loudspeaker interface configured to send first acoustic signals to first loudspeaker; second loudspeaker interface configured to send second acoustic signals to second loudspeaker; microphone interface configured to receive microphone data from microphone; acoustic processor configured to generate acoustic signal output to each of first and second loudspeakers; and non-transitory memory comprising instructions executable by the acoustic processor, instructions when executed by acoustic processor, cause system to: receive microphone data via microphone interface; determine, using microphone data, time delay between reproduction of first acoustic signals on first loudspeaker and reception of corresponding sound by microphone; determine, using time delay, position of microphone relative to first loudspeaker; and determine, based on position of microphone relative to first loudspeaker, first filter parameter for modifying first acoustic signals or second acoustic signals.

9 Claims, 11 Drawing Sheets

(56) References Cited

U.S. PATENT DOCUMENTS

| | | | | |
|---|---|---|---|---|
| 2015/0287400 | A1 | 10/2015 | Christoph | |
| 2018/0109895 | A1 | 4/2018 | Audfray et al. | |
| 2018/0324540 | A1 * | 11/2018 | Liu | H04R 1/26 |
| 2020/0267474 | A1 * | 8/2020 | Christoph | H04S 3/002 |
| 2020/0275231 | A1 * | 8/2020 | Christoph | H04S 3/02 |
| 2022/0014868 | A1 * | 1/2022 | Binn | H04S 7/303 |
| 2023/0093585 | A1 * | 3/2023 | Faundez Hoffmann | G10L 25/18<br>704/200 |

* cited by examiner

DYNAMIC ACOUSTIC CONTROL SYSTEMS AND METHODS

BACKGROUND

Field

The disclosed subject matter generally relates to a system and method for delivering an auxiliary audio to a target user. More particularly, the system and method for modifying and reproducing acoustic signals to provide an immersive surround sound experience to the target user in real-time.

Description of Related Art

Conventional surround sound systems include a source of surround sound data, such as a videogame console/electronic gaming system, which provides a plurality of audio data channels to a digital amplifier. The amplifier converts the audio data into analog signals and amplifies them for output to respective loudspeakers arranged within a room containing the surround sound system. However, modern systems are inadequate for various purposes, and improvements thereto are described herein.

SUMMARY

The following presents a summary of the disclosure in order to provide a basic understanding of the technology. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are embodiments of a system that reproduces/tunes acoustic signals (audio parameters) to provide an immersive surround sound experience to a target user occupied in a chair in real-time based on the user's usage conditions, such as the distance from an electronic device.

In some embodiments, a system provides the immersive surround sound experience by incorporating a second loudspeaker, a microphone, and an audio processor/acoustic processor into the chair.

In some embodiments the system identifies the position of the chair from a first loudspeaker of an electronic device and the chair microphone.

In some embodiments the system identifies the position of a microphone relative to the first loudspeaker and the second loudspeaker.

In some embodiments the system plays auxiliary audio from the chair's speaker (the second loudspeaker) to shift the sound image closer to a target user position.

In some embodiments the system calculates the distance between the chair and the first loudspeaker by measuring a time delay.

In some embodiments the system provides the immersive surround sound experience irrespective of the distance from the electronic device to the target user position and/or the chair.

In some embodiments the system uses the microphone attached to the headrest of the chair (for chat/access network controller).

Another objective of the present disclosure is directed towards a system that uses the second loudspeaker of the chair and the first loudspeaker of the electronic device together to provide an immersive experience to the target user.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1A:
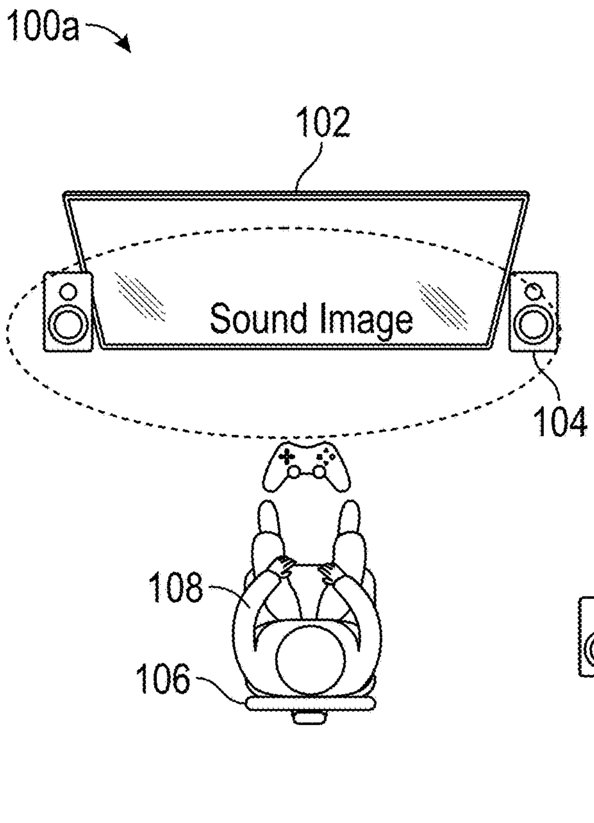
FIG. 1A, FIG. 1B show example surround sound entertainment systems, in accordance with one or more exemplary embodiments.

Furthermore, the objects and advantages of this invention will become apparent from the following description and the accompanying annexed drawings.

DETAILED DESCRIPTION

Video games have been a popular form of entertainment. Electronic video gaming systems have been a cornerstone of the gaming industry for several years. The electronic gaming system delivers surround sound through a surround sound system and/or through a gaming chair to make the game fun to play and provides an immersive gaming experience to a game player. In conventional surround sound systems, a source of surround sound data, such as a DVD or Blu-Ray® disc player or a videogame console/electronic gaming system provides a plurality of audio data channels to a digital amplifier. The amplifier typically converts the audio data into analog signals and amplifies them for output to respective loudspeakers (speakers) arranged within a room containing the surround sound system. Many computer elements have been employed in the gaming systems, from computerized animation to playing prerecorded sounds through the speakers. For example, these sounds are loaded within the gaming system and played through the speakers to supplement and enhance the game experience.

An improper set-up surround sound system results in noticeably inferior sound quality and/or inaccurate reproduction of the sound. One or more of a variety of parameters, including speaker location, listener location, phase delay, speaker level, equalization, and bass management, may play a part in the surround sound set-up and subsequent audio performance. Existing surround sound systems allow the user to adjust the parameters manually, either on a handheld remote control or on the main surround sound unit. Parameters adjustment for multi-channel surround sound is becoming increasingly complex and difficult, especially with digital multi-channel audio.

Gaming chairs can provide quality audio to the gaming player occupied in the gaming chair. Conventional gaming chairs are generally placed in front of the electronic gaming system only for the purpose of enabling the game player to sit in the gaming chair. The spacing between the gaming chair and the gaming machine may be fixed.

Existing gaming chairs do not adequately allow adjustment of the audio parameters automatically based on the distance from the gaming system to the gaming chair position. As a result, there is a need to increase the gaming experience by providing increased audio capabilities for the gaming systems.

In light of the aforementioned discussion, there exists a need for a system that tunes audio parameters for providing an immersive surround sound experience in real-time based on the user's usage conditions, such as the distance from a source.

The present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising", or "having" and variations thereof herein is meant to encompass the items listed thereafter and equivalents thereof as well as additional items. The terms "a" and "an" herein do not denote a limitation of quantity, but rather denote the presence of at least one of the referenced items. Further, the use of terms "first", "second", and "third", and the like, herein do not denote any order, quantity, or importance, but rather are used to distinguish one element from another.

Figure 1B:
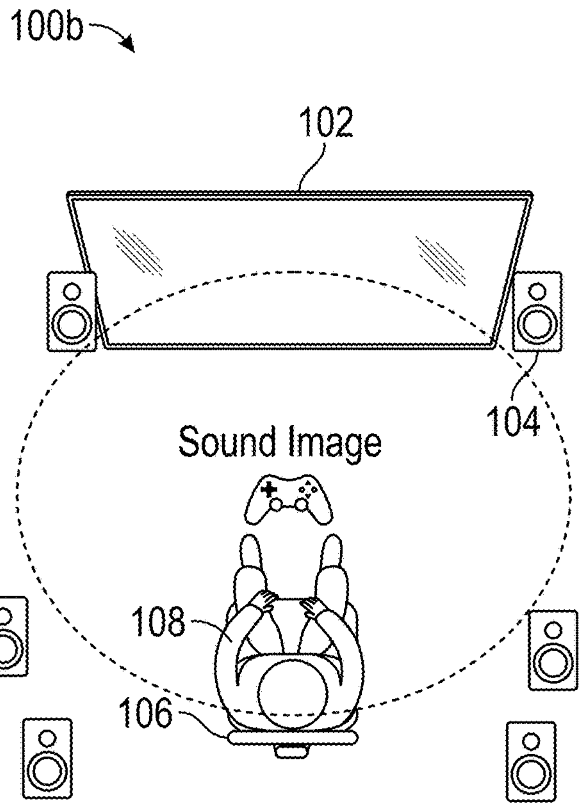

Referring to FIG. 1A, FIG. 1B show diagrams 100*a*, 100*b* depicting an existing surround sound entertainment system, in accordance with one or more exemplary embodiments. The diagrams 100*a* and 100*b* depict an electronic device 102, loudspeakers 104, a chair 106, and a target user 108.

The electronic device 102 may be operatively coupled to the loudspeakers 104. The electronic device 102 may be operated by the target user 108 from a target user position. The electronic device 102 may include, but is not limited to, a gaming console, a video game console, a gaming system, a desktop computer, a personal mobile computing device such as a tablet computer, a laptop computer, or a netbook computer, a smartphone, a server, an augmented reality device, a virtual reality device, a digital media player, a television set, a piece of home entertainment equipment, backend servers hosting database and other software, and the like. The target user 108 may include, but is not limited to, a player, an individual, a game player, a gamer, and the like.

The electronic device 102 may be operatively coupled to the chair 106. The electronic device 102 may be configured to generate the sound image through the loudspeakers 104. The sound image may be located closer to a display screen of the electronic device 102 while playing games at home using the loudspeakers 104. Accordingly a loud volume may be used to get a sense of reality or a 5.1 Channel or more multi-channel audio may be used to sense the sound experience. Although it is possible to experience an immersive experience using the headphones, it may be advantageous to include a system that does not rely solely or at all on a head-fixed sound image. Moreover, use of loudspeakers may allow a user to hear external sounds. The diagram 100*b* depicts the burden on the target user 108 in terms of target user location restrictions and cost.

Figure 2A:
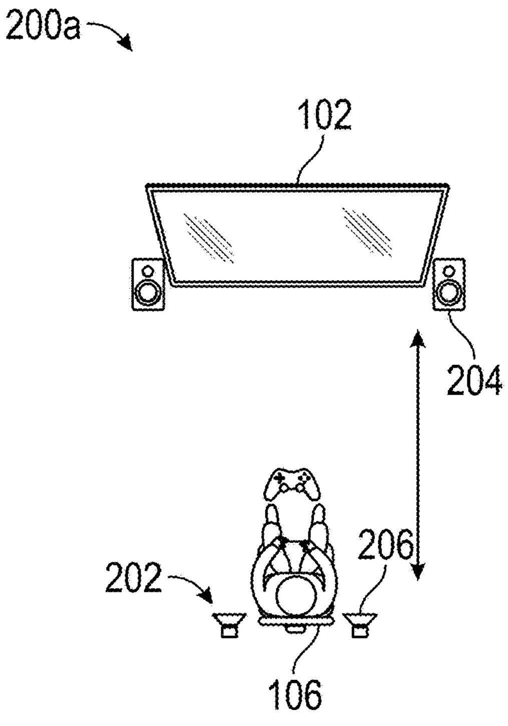
FIG. 2A, FIG. 2B, and FIG. 2C are example diagrams depicting a system for modifying and reproducing acoustic signals to provide an immersive experience to the target user, in accordance with one or more exemplary embodiments.
Figure 2B:
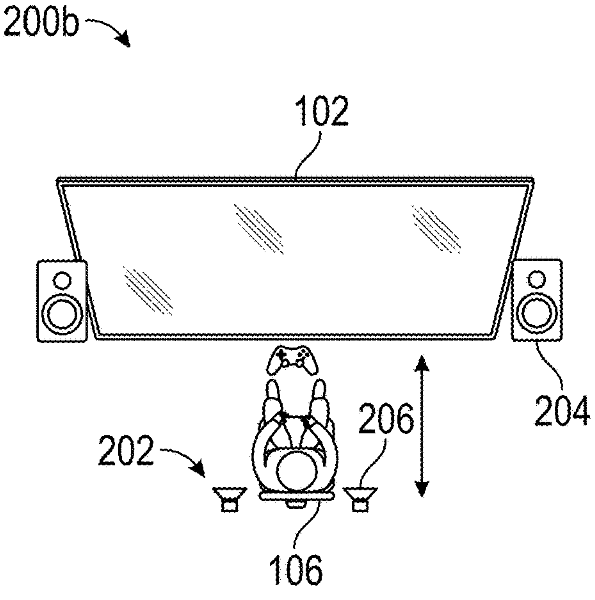
Figure 2C:
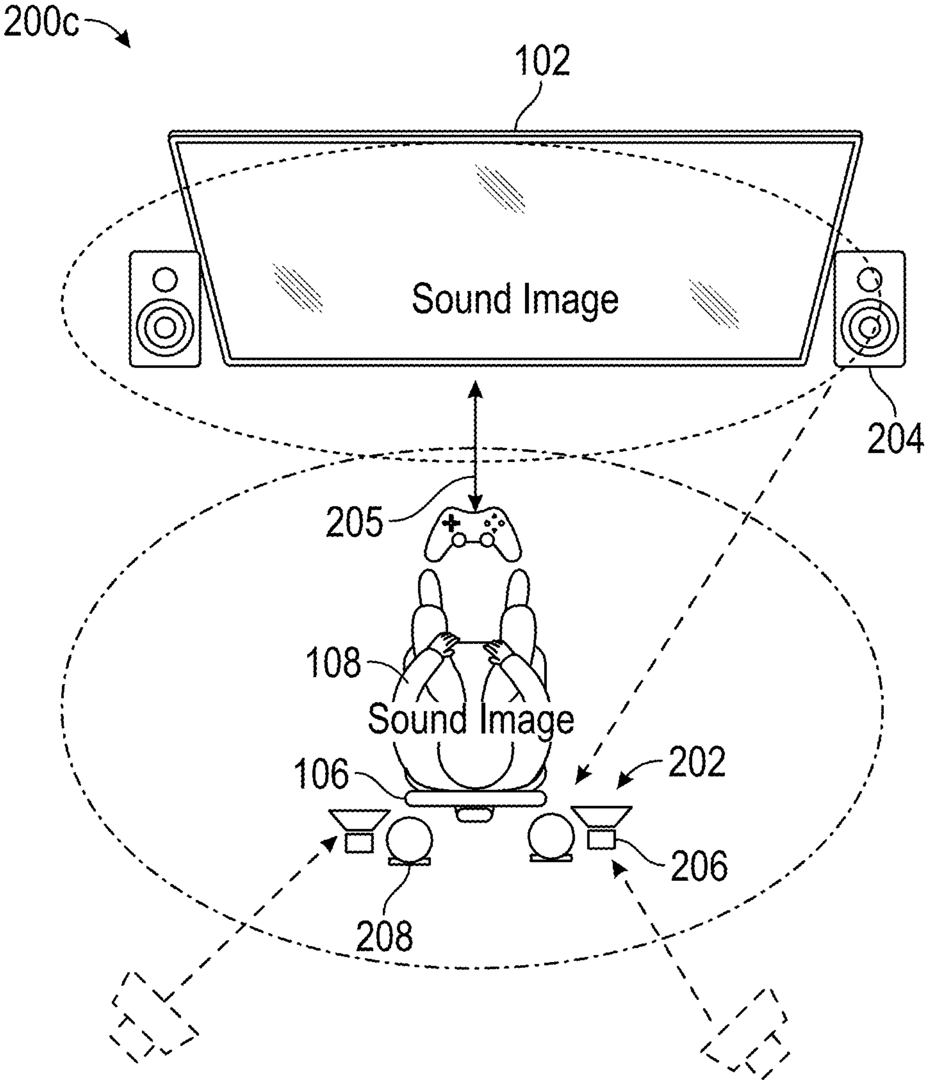
Figure 4:
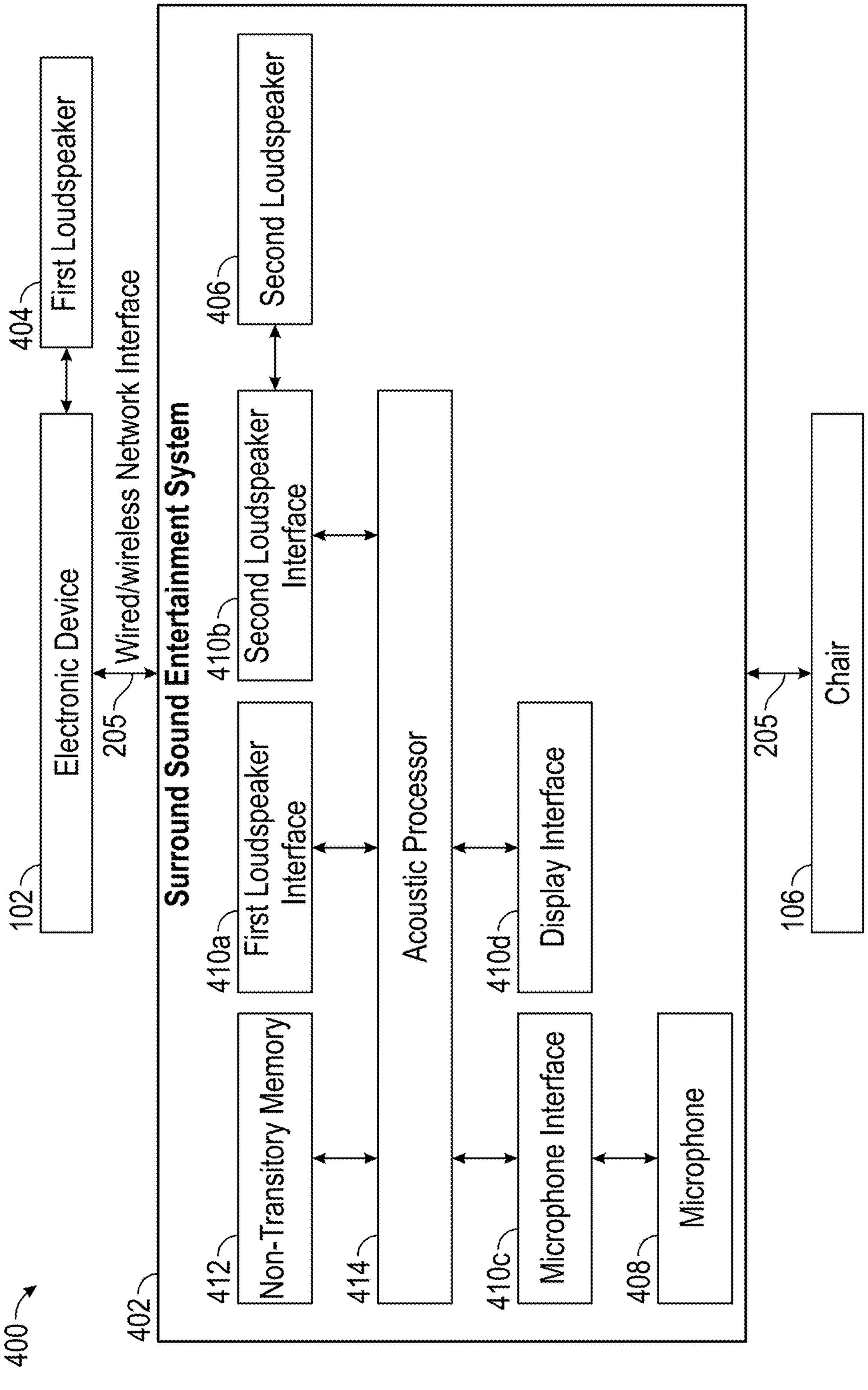
FIG. 4 is a block diagram depicting a schematic representation of the system for modifying and reproducing acoustic signals to provide the immersive surround sound experience to the target user in real-time, in accordance with one or more exemplary embodiments.

FIG. 2A, FIG. 2B, and FIG. 2C are example diagrams 200*a*, 200*b*, and 200*c* depicting a system for modifying acoustic signals to provide an immersive experience to the target user, in accordance with one or more exemplary embodiments. The diagrams 200*a*, 200*b*, and 200*c* depict a surround sound entertainment system 202, a first loudspeaker 204, a wired/wireless network interface 205, the electronic device 102, the chair 106, and the target user 108. The surround sound entertainment system 202 may include, a second loudspeaker 206, a microphone 208 and an exciter/acoustic/audio processor (as shown in FIG. 4). The surround sound entertainment system 202 may be integrated into the chair 106 or connected between the chair 106 and the electronic device 102 through the wired/wired less network interface 205. The wired/wireless network interface 205 may include, but is not limited to, wired and/or wireless components. The wired/wireless network interface 205 can provide access to a network (e.g., Internet, home network, etc.) and/or may be any of a wide variety of various wire or wireless interface components including an Ethernet card or interface module, a modem, a Bluetooth module, a cable modem, and the like without limiting the scope of the present disclosure.

The electronic device 102 may be operably coupled to the first loudspeaker 204. The surround sound entertainment system 202 may be configured to generate the first acoustic signals on the first loudspeaker 204 and the second acoustic signals on the second loudspeaker 206. The microphone 208 may be configured to receive microphone data from sounds in the area, such as from the first loudspeaker 204. The acoustic processor (as shown in FIG. 4, 414) can use the microphone data to determine a time delay between the reproduction of the first acoustic signals on the first loudspeaker 204 and the reception of corresponding sound by the microphone 208. The microphone data may include, but is not limited to, the first acoustic signals on the first loudspeaker 204 or the second loudspeaker 206, the second acoustic signals on the first loudspeaker 204 or the second loudspeaker 206, and the like.

The surround sound entertainment system 202 may be configured to enable the acoustic processor to determine a position of the microphone 208 relative to the first loudspeaker 204 using the time delay. The surround sound entertainment system 202 may be configured to enable the acoustic processor to determine the position of the microphone 208 relative to the first loudspeaker 204 and the second loudspeakers 206. The surround sound entertainment system 202 may be configured to enable the acoustic processor to determine the target user position upon determining the position of the microphone 208 relative to the first loudspeaker 204 and the second loudspeakers 206. The surround sound entertainment system 202 may be configured to enable the acoustic processor to determine a first filter parameter for modifying the first acoustic signals based on the position of the microphone 208 relative to the first loudspeaker 204.

Figure 3A:
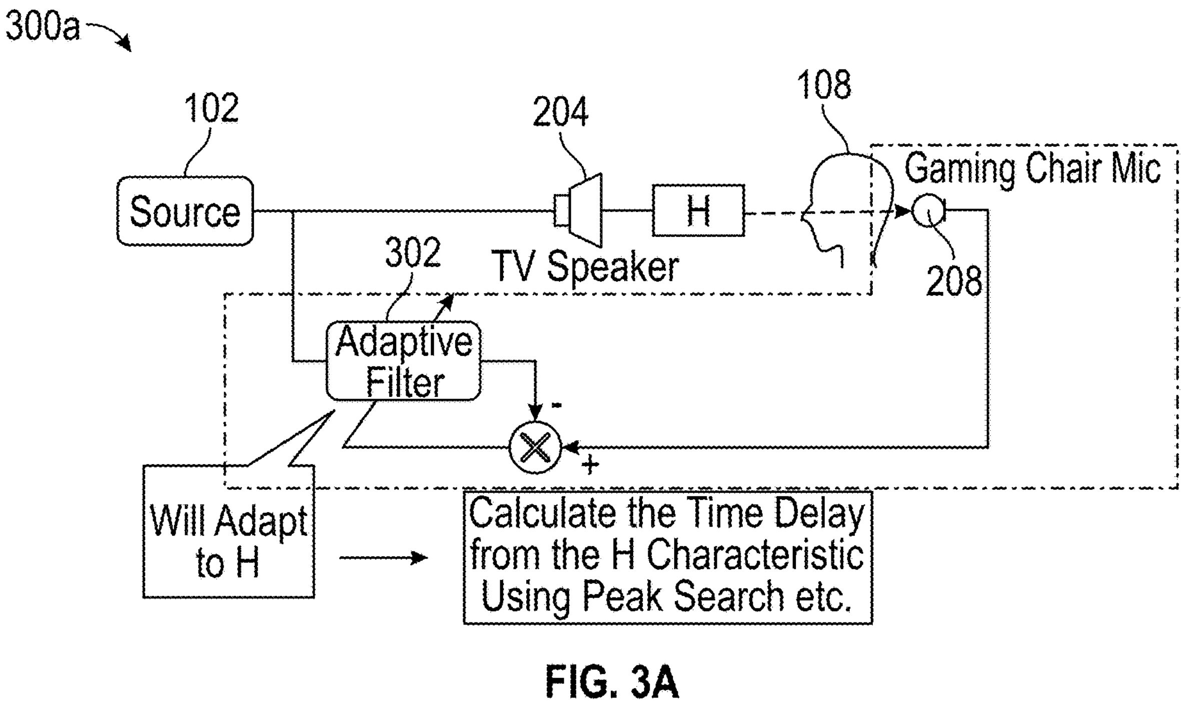
FIG. 3A, FIG. 3B, FIG. 3C and FIG. 3D are example diagrams depicting the calculation of distance between the electronic device and the target user position/the chair, in accordance with one or more exemplary embodiments.
Figure 3B:
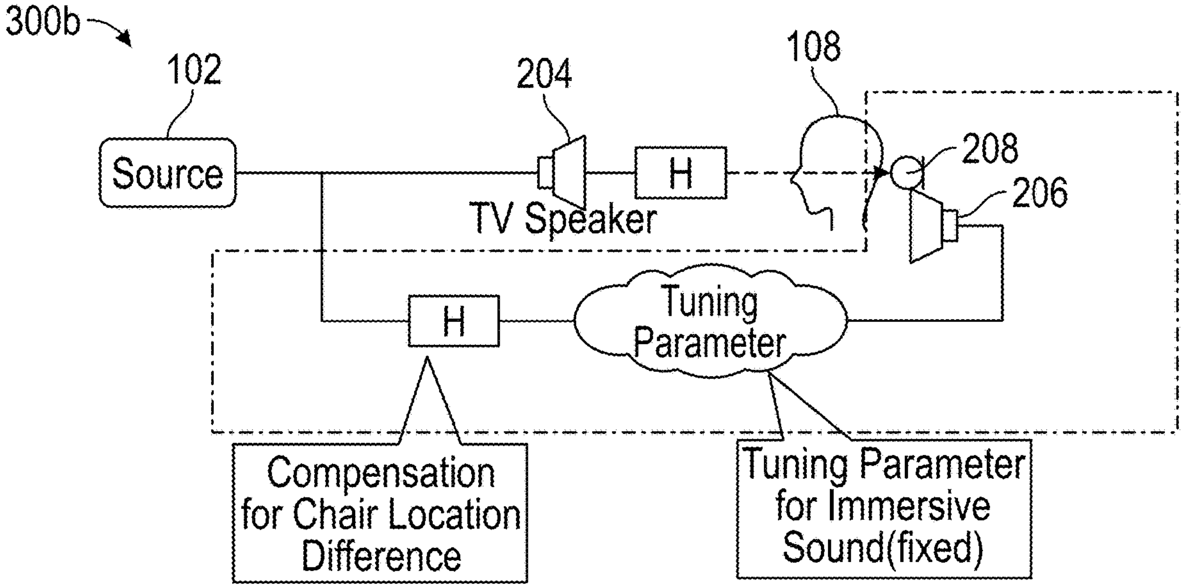
Figure 3C:
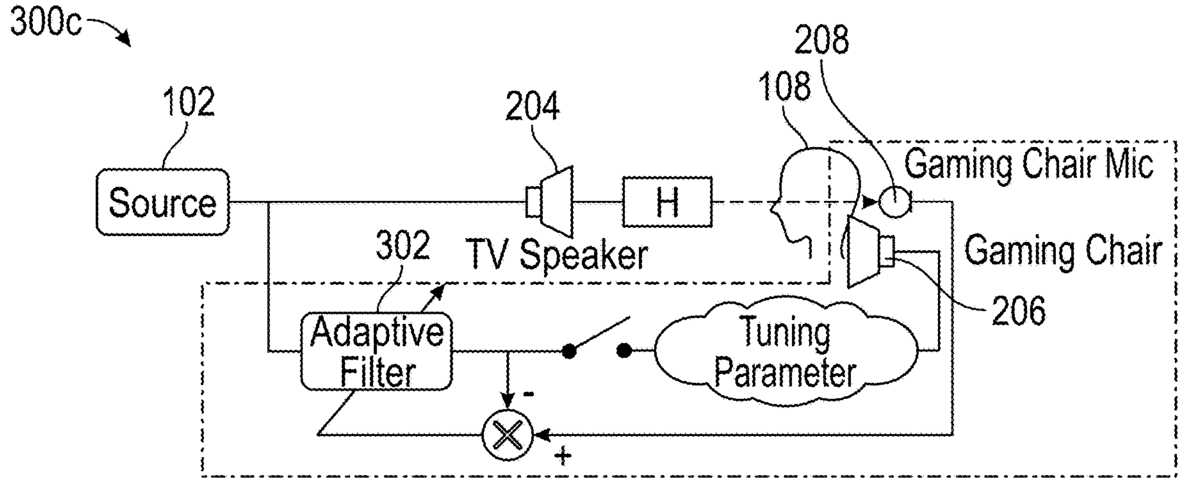
Figure 3D:
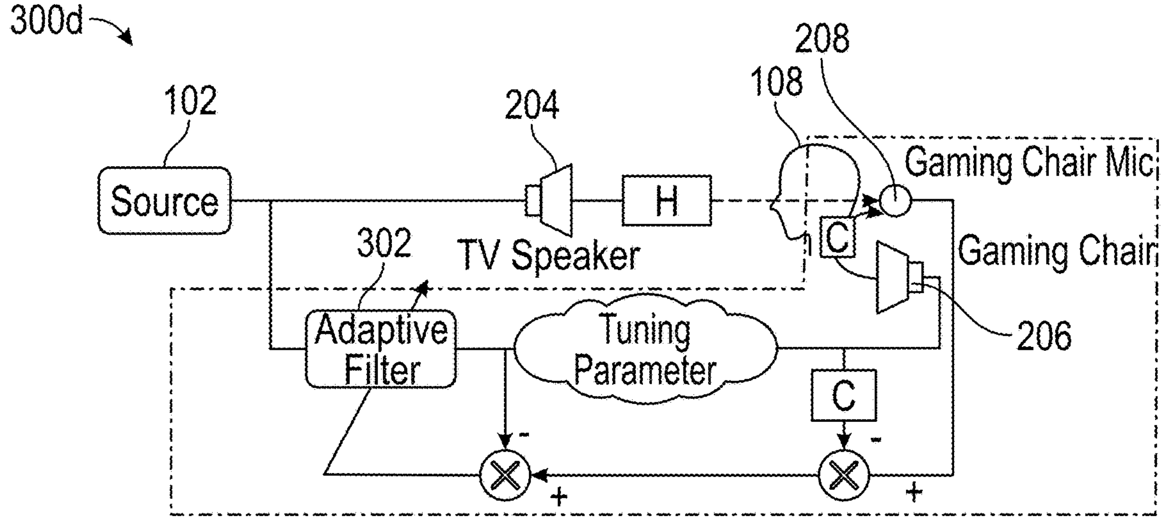

The first filter parameter may a compensation metric for compensating for modifying the first acoustic signals (e.g., to compensate for the distance between the microphone box 208 and the first loudspeaker box 204). The distance between the chair 106 and the electronic device 102 may be represented as H (see FIG. 3A) and/or may correspond to the first filter parameter. Additionally or alternatively, the compensation metric may be derived from the first filter parameter. The surround sound entertainment system 202 may be configured to enable the acoustic processor to determine the first filter parameter for modifying the second acoustic signals based on the position of the microphone 208 relative to the first loudspeaker 204.

The surround sound entertainment system 202 may be configured to enable the acoustic processor to generate the first acoustic signals or second acoustic signals on the first loudspeaker 204 for reproducing the sound image at the target user position based on the first filter parameter. The surround sound entertainment system 202 may be configured to enable the acoustic processor to generate the first acoustic signals or second acoustic signals on the second loudspeaker 206 for reproducing the sound image at the target user position based on the first filter parameter. The surround sound entertainment system 202 may be configured to enable the acoustic processor to reproduce the generated first acoustic signals on the first loudspeaker 204 for reproducing the sound image at the target user position based on the first filter parameter. The surround sound entertainment system 202 may be configured to enable the acoustic processor to reproduce the generated second acoustic signals on the second loudspeaker 204 for reproducing the sound image at the target user position based on the first filter parameter.

The position of the chair 106 and the target user 108 may be calculated from the first loudspeaker 204 and the microphone 208 by measuring the time delay. The second loudspeaker 206 may be configured to play auxiliary audio to shift the sound image closer to the target user 108.

The surround sound entertainment system 202 may be configured to provide a new user experience by incorporating the second loudspeaker 206, the microphone 208, and the exciter/acoustic processor (as shown in FIG. 4) into the chair 106. The surround sound entertainment system 202 may be configured to modify the first and second acoustic signals depending on the user's usage conditions, such as the distance from the electronic device 102 to the chair 106. The surround sound entertainment system 202 may be configured to calculate the distance between the electronic device 102 and the chair 106 from the measured time delay. The surround sound entertainment system 202 may be configured to perform auto compensation to provide the immersive feeling to the target user 108. The auto compensation may increase the level of the high and low frequencies of the first loudspeaker 204 and the second loudspeaker 206, which may be based on the measured time delay.

FIG. 3A, FIG. 3B, FIG. 3C and FIG. 3D show example diagrams 300*a*, 300*b*, 300*c*, and 300*d* depicting various metrics related to improve the sound experience, such as the calculation of distance between the electronic device and the chair, in accordance with one or more exemplary embodiments. The diagram 300*a* depicts an adaptive filter 302, the surround sound entertainment system 202, the electronic device 102 (source), the first loudspeaker 204, and the microphone 208. The adaptive filter 302 may be configured to compare the sound recorded between reproduction of the first acoustic signals on the first loudspeaker 204 of the electronic device 102 and the reception of corresponding sound by the microphone 208 to calculate the time delay using the microphone data. The adaptive filter 302 may include a computational modification applied to a signal that instructs the first loudspeaker 204 or the second loudspeaker 206 to emit a particular sound. Speakers in a kind of "surround sound" orientation can generate a sound image or audio image by emitting certain sounds at proper delays to create an audio effect (e.g., footsteps going from left to right, spaceship flying behind the viewer). In general, speakers at the same location may output audio at the same time without needing to know the positions of other speakers. However, speakers at different locations relative to the user may be able to present a 3D audio image, thus providing the user with a sense that sounds are coming from other locations rather than just from in front of them (e.g., behind them, to the sides). In order to present an audio effect of a sound coming from a particular 3D location (e.g., left side and back of the person), the speakers may need to present sound at different times. That offset may be based on the distance between the first loudspeaker 204 and the second loudspeaker (rear chair speaker) 206.

In an exemplary embodiment of the disclosure, the procedure for calculating the distance between the electronic device 102 and the chair 106 from the measured time delay include, the surround sound entertainment system 202 may be configured to sense the sound emitted by the first loudspeaker 204 and the sound received by the microphone 208. The distance may be computed by measuring the time difference, and multiplying that time difference by the speed of sound.

In another exemplary embodiment of the disclosure, the procedure for calculating the distance between the electronic device 102 and the chair 106 from the measured time delay include, the surround sound entertainment system 202 may be configured to sense the acoustic signal (audio signal) instruction sent to the first loudspeaker 204 and obtaining an audio input signal at the microphone 208. The filter parameters may be used to offset the difference between when the acoustic signal is sent by the first loudspeaker 204 and when the signal is received by the microphone 208, and the filter parameters/offset may be modified until the sent signal and received signal correspond to each other. Based on the offset, the distance may be calculated.

The diagram 300*b* depicts an exemplary embodiment of applying a compensation metric to account for a chair location difference. The diagram 300*b* includes, the surround sound entertainment system 202, the adaptive filter 302, the electronic device 102(source), the first loudspeaker 204, the second loudspeaker 206, and the microphone 208. The surround sound entertainment system 202 may be configured to use compensation metric to project the sound image at the target user position (e.g., at the target user's ears or at the chair microphone 208). The compensation metric may be derived from the filter parameters. The projection of the sound image at the target user position may be performed once a tuning parameter, the filter parameter, and/or compensation metric (e.g., H) are determined (e.g., based on the distance between the electronic device 102 and the chair 106). The compensation metric may include a mathematical function, number, or expression that is used to modify an electronic signal that instructs a speaker to emit a certain audio signal.

The diagram 300*c* depicts an exemplary embodiment of implementation of the system where a pattern that exclusively switches between measurement and correction. The diagram 300*c* includes, the surround sound entertainment system 202, the adaptive filter 302, the electronic device 102(source), the first loudspeaker 204, the second loudspeaker 206, and the microphone 208. The adaptive filter 302 may be configured to adapt no signal from the second loudspeaker 206 while measuring. The adaptive filter 302 does not adapt and works as a fixed FIR filter when compensated.

The diagram 300*d* depicts an exemplary embodiment of the patterns that always adapts. The diagram 300*d* includes, the surround sound entertainment system 202, the adaptive filter 302, the electronic device 102 (source), the first loudspeaker 204, the second loudspeaker 206, and the microphone 208. The adaptive filter 302 may adapt with an error signal configured to eliminate the error signal using the transfer function that was measured previously between the first loudspeaker 204 and the microphone 208.

FIG. 4 is a block diagram 400 representing a system in which aspects of the present disclosure can be implemented. FIG. 4 depicts a schematic representation of the system for modifying and reproducing acoustic signals to provide the immersive surround sound experience to the target user in real-time, in accordance with one or more exemplary embodiments. The system 400 includes a surround sound entertainment system 402, the electronic device 102, the first loudspeaker 404, the chair 106, and the wired/wireless network interface 205. The surround sound entertainment system 402 includes a second loudspeaker 406, a microphone 408, a first loudspeaker interface 410*a*, a second loudspeaker interface 410*b*, a microphone interface 410*c*, a display interface 410*d*, a non-transitory memory 412, and an acoustic processor 414. The system 400 is preferably realized as a gaming system in that the electronic device 102 is configured as a computer-based electronic device.

The electronic device 102 may be operatively coupled to the first loudspeaker 404 through the first loudspeaker interface 410*a*. The display interface 410*d* may be operatively coupled to the electronic device 102. The surround sound entertainment system 402 may be operatively coupled to the first loudspeaker 404 via the first loudspeaker interface 410*a*. The first loudspeaker interface 410*a* may be configured to send the first acoustic signals to the first loudspeaker 404.

The surround sound entertainment system 402 may be operatively coupled to the chair 106 and the second loudspeaker 406 over the wired/wireless network interface 205. The chair 104 may be operatively coupled to the electronic device 102 over the wired/wireless network interface 205. The wired/wireless network interface 205 may include, but is not limited to, wired and/or wireless components. The wired/wireless network interface 205 provides access to a network (e.g., Internet, home network, etc.) and may be any of a wide variety of various wire or wireless interface components including an Ethernet card or interface module, a modem, a Bluetooth module, a cable modem, and the like without limiting the scope of the present disclosure.

The second loudspeaker interface 410*b* may be configured to send the second acoustic signals to the second loudspeaker 406. The second loudspeaker 406 may be operably coupled to chair 106 to receive the second acoustic signals. The second acoustic signals may be received from the second loudspeaker interface 410*b*, or the second acoustic signals may be received from the wired/wireless network interface 205 communicably coupled the chair 106 to the second loudspeaker 406.

The microphone interface 410*c* may be configured to receive the microphone data from the microphone 408. The acoustic processor 414 may be configured to receive the microphone data via the microphone interface 410*c*. The position of the microphone 408 relative to the first loudspeaker 404 and the second loudspeaker 406 may be identified using the time delay. The position of the target user 108 (e.g., as shown in FIG. 1A, FIG. 1B, and FIG. 2C) may be determined upon identifying the position of the microphone 408 relative to the first loudspeaker 404 and the second loudspeaker 406. The target user position may be determined by obtaining the distance between the microphone 408 and the target user position. The distance between the microphone 408 and the target user position may be less than about 10 cm, less than about 20 cm, less than about 25 cm, less than about 35 cm, less than about 45 cm, less than about 55 cm, less than about 65 cm, less than about 75 cm, less than about 85 cm, less than about 100 cm, less than about 150 cm, less than any value therein, or fall within a range having endpoints therein. For example, in some embodiments, the distance may be less than about 50 cm. The second loudspeaker 406 may be operatively connected to the target user position (e.g., chair 106). The second loudspeaker 406 may be separated from the microphone 408 by a minimum distance. The minimum distance for separating the second loudspeaker 406 from the microphone 408 may be less than about 10 cm, less than about 20 cm, less than about 25 cm, less than about 35 cm, less than about 45 cm, less than about 55 cm, less than about 65 cm, less than about 75 cm, less than about 85 cm, less than about 100 cm, less than about 150 cm, less than any value therein, or fall within a range having endpoints therein. For example, in some embodiments, the minimum distance is less than about 75 cm, which may provide a beneficial trade-off between being too far from the user and being too intrusive.

The non-transitory memory 412 may be configured to store the instructions executable by the acoustic processor 414. The instructions executable by the acoustic processor 414 may be configured to be executed by the acoustic processor to perform various tasks described herein The acoustic processor 414 may be configured to determine the time delay between reproduction of the first acoustic signals on the first loudspeaker 404 and reception of corresponding sound by the microphone 408 using the microphone data. The acoustic processor 414 may be configured to determine the position of the microphone 408 relative to the first loudspeaker 404 using the time delay.

The acoustic processor 414 may be configured to determine the first filter parameter for modifying the first acoustic signals or the second acoustic signals based on the position of the microphone 408 relative to the first loudspeaker 404 or the second loudspeaker 406.

The acoustic processor 414 may be configured to generate acoustic signals on one or more loudspeakers, such as the first loudspeaker 404, for reproducing the sound image at the target user position. The reproducing of the sounds may be based on one or more filter parameters described herein. For example, t---he acoustic processor 414 may be configured to generate the first acoustic signals or second acoustic signals on the second loudspeaker 406 for reproducing the sound image at the target user position based on the first filter parameter. The acoustic processor 414 may be configured to reproduce the generated first acoustic signals on the first loudspeaker 404 for reproducing the sound image at the target user position based on the first filter parameter. The acoustic processor 414 may be configured to reproduce the generated second acoustic signals on the second loudspeaker 406 for reproducing the sound image at the target user position based on the first filter parameter.

Figure 5A:
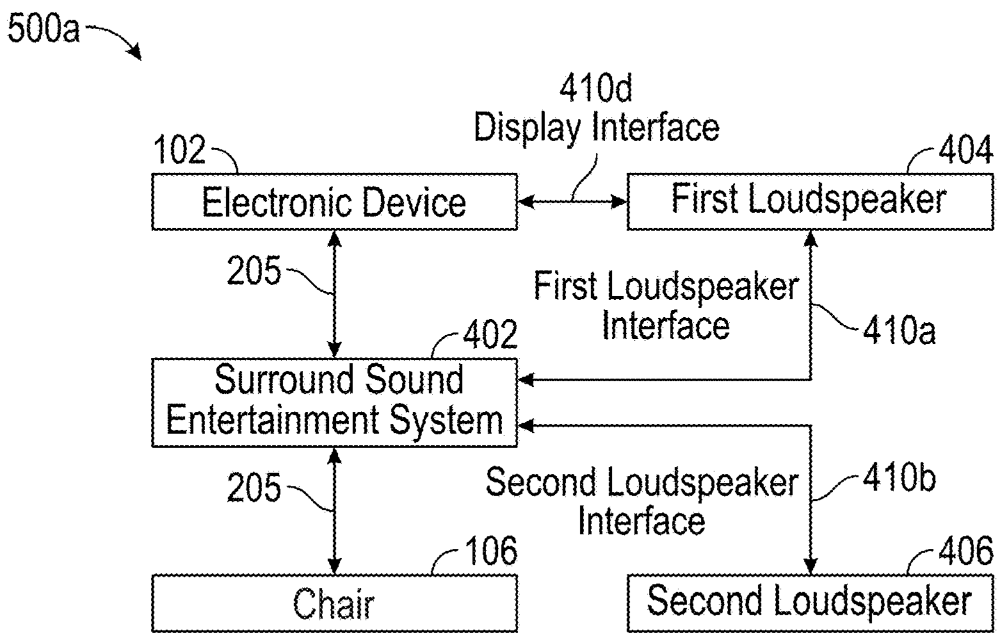
FIG. 5A is a block diagram depicting a schematic representation of the system for sending the first and second acoustic signals to the first loudspeaker or the second loudspeaker, in accordance with one or more exemplary embodiments.

FIG. 5A is a block diagram 500*a* depicting a system in which aspects of the present disclosure can be implemented. FIG. 5A depicts a schematic representation of the system for sending the first and second acoustic signals to the first loudspeaker and/or the second loudspeaker, in accordance with one or more exemplary embodiments. The diagram 500*a* includes the surround sound entertainment system 402, the first loudspeaker 404, the second loudspeaker 406, the first loudspeaker interface 410*a*, the second loudspeaker interface 410*b*, the display interface 410*d*, the wired/wireless network interface 205, the electronic device 102, and the chair 106.

The electronic device 102 may be operatively coupled to the first loudspeaker 404 via the display interface 410*d*. The surround sound entertainment system 402 may be operatively coupled to the first loudspeaker 404 via the first loudspeaker interface 410*a*. The first loudspeaker interface 410*a* may be configured to send the first acoustic signals to the first loudspeaker 404. The surround sound entertainment system 402 may be operatively coupled to the chair 106 and the second loudspeaker 406.

The second loudspeaker interface 410*b* may be configured to send the second acoustic signals to the second loudspeaker 406. The second loudspeaker 406 may be operably coupled to chair 106 to receive the second acoustic signals. The second acoustic signals may be received from the second loudspeaker interface 410*b*, or the second acoustic signals may be received from the wired/wireless network interface 205 communicably coupled the chair 106 to the second loudspeaker 406.

Figure 5B:
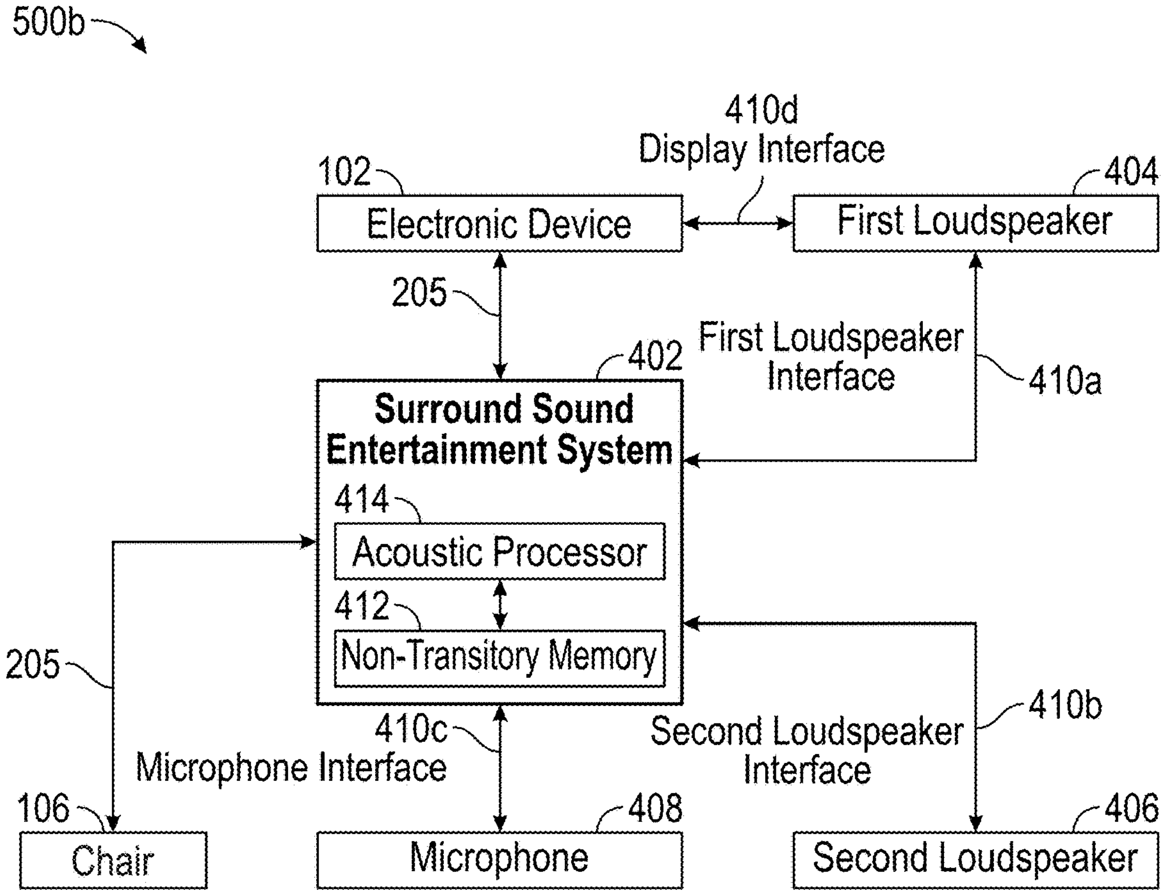
FIG. 5B is a block diagram depicting a schematic representation of the system for receiving the microphone data via the microphone interface, in accordance with one or more exemplary embodiments.

FIG. 5B is a block diagram 500*b* depicting a system in which aspects of the present disclosure can be implemented. Specifically, FIG. 5B depicts a schematic representation of the system for receiving the microphone data via the microphone interface, in accordance with one or more exemplary embodiments. The diagram 500*b* includes the surround sound entertainment system 402, the first loudspeaker 404, the second loudspeaker 406, the first loudspeaker interface 410*a*, the second loudspeaker interface 410*b*, the display interface 410*d*, the wired/wireless network interface 205, the electronic device 102, the chair 106, the microphone interface 410*c*, and the microphone 408. The surround sound entertainment system 402 includes the acoustic processor 414, and the non-transitory memory 412. The surround sound entertainment system 402 may be integrated into the chair 106 or operatively coupled to the chair 106 through the wired/wireless network interface 205.

The microphone interface 410*c* may be configured to receive microphone data from the microphone 408. The microphone data may include, but is not limited to, the first acoustic signals of the first loudspeaker 404 or the second loudspeaker 406, the second acoustic signals of the first loudspeaker or second loudspeaker, and the like. Further, the acoustic processor 414 may be configured to receive the microphone data via the microphone interface 410*c*. The position of the microphone 408 relative to the first loudspeaker 404 and the second loudspeaker 406 may be identified using the target user position. The target user position may be determined by obtaining a distance between the microphone 408 and the target user position. The distance between the microphone 408 and the target user position may be less than 50 cm. The second loudspeaker 406 may be operatively connected to the target user position. The second loudspeaker 406 may be separated from the microphone 408 by a minimum distance. The minimum distance for separating the second loudspeaker 406 from the microphone 414 may be less than 75 cm.

Figure 5C:
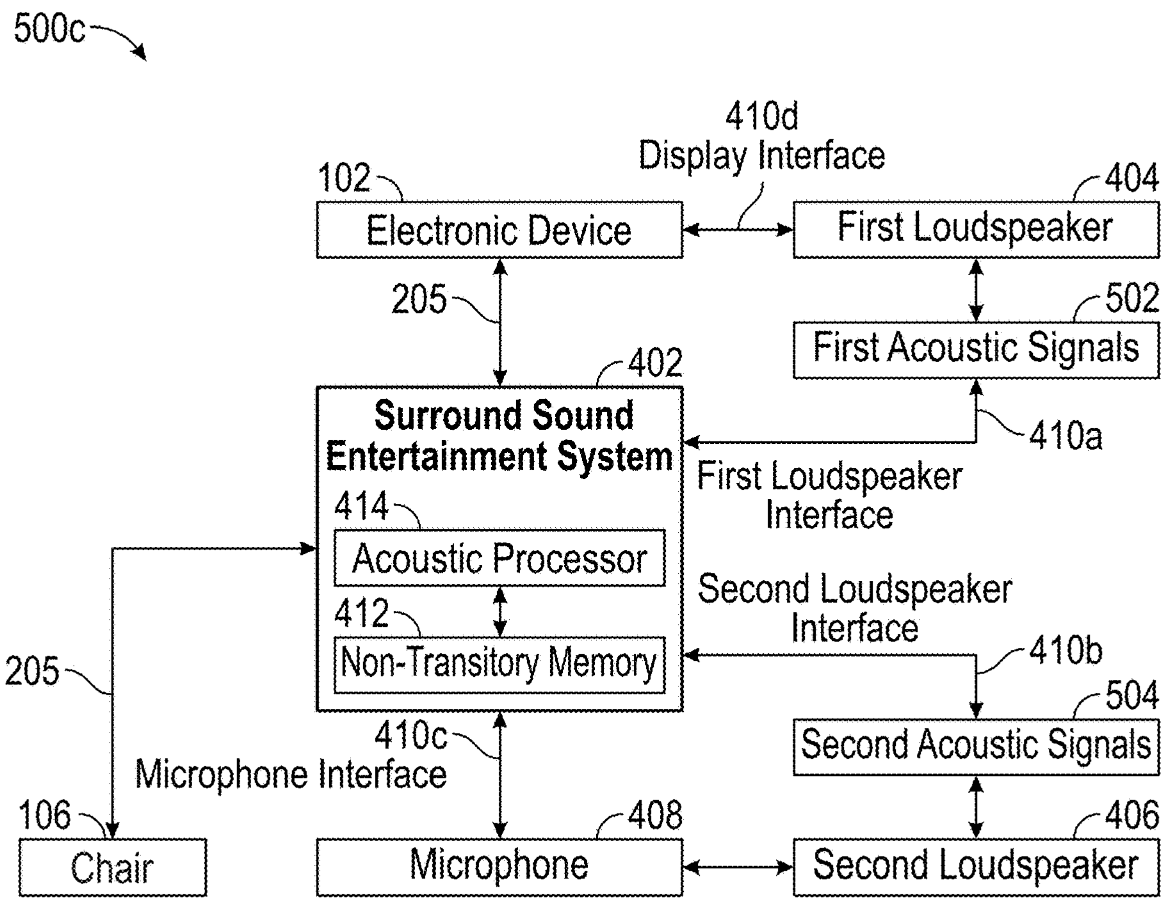
FIG. 5C is a block diagram depicting a schematic representation of the system for executing instructions by the acoustic processor, in accordance with one or more exemplary embodiments.

Referring to FIG. 5C, FIG. 5C is a block diagram 500*c* depicting a system in which aspects of the present disclosure can be implemented. Specifically, FIG. 5C depicts a schematic representation of the system for executing instructions by the acoustic processor, in accordance with one or more exemplary embodiments. The diagram 500*c* includes the surround sound entertainment system 402, the first loudspeaker 404, the second loudspeaker 406, the first loudspeaker interface 410*a*, the second loudspeaker interface 410*b*, the display interface 410*d*, the wire/wireless network interface 205, the electronic device 102, the chair 106, the microphone interface 410*c*, and the microphone 408. The surround sound entertainment system 402 includes the acoustic processor 414, the non-transitory memory 412, a first acoustic signals 502, and a second acoustic signals 504.

The first loudspeaker interface 410*a* may be configured to send the first acoustic signals 502 to the first loudspeaker 404. The second loudspeaker interface 410*b* may be configured to send the second acoustic signals 504 to the second loudspeaker 406. The microphone interface 410*c* may be configured to receive microphone data from the microphone 408. The acoustic processor 414 may be configured to generate the first acoustic signals 502 or the second acoustic signals 506 on the first loudspeaker 404 and the second loudspeaker 406.

The acoustic processor 414 may be configured to execute the instructions stored in the non-transitory memory 412. The instructions executable by the acoustic processor 414 may include, but are not limited to, receiving the microphone data via the microphone interface 410*c*, determining time delay between reproduction of the first acoustic signals 502 on the first loudspeaker 404 and reception of corresponding sound by the microphone 408 using the microphone data, determining position of the microphone 508 relative to the first loudspeaker 404 using the time delay, and determining a first filter parameter (e.g., as shown in FIG. 5E) 510 for modifying at least one of the first acoustic signals 502 or the second acoustic signals 504 based on the position of the microphone 408 relative to the first loudspeaker 404, generating the first acoustic signals 502 on the first loudspeaker 404 for reproducing the sound image on the first loudspeaker 404 at the target user position based on the first filter parameter 510, generating the second acoustic signals 504 on the second loudspeaker 406 for reproducing the sound image on the second loudspeaker 406 at the target user position based on the first filter parameter 510, reproducing the generated first acoustic signals 502 on the first loudspeaker 404, reproducing the generated second acoustic signals 504 on the second loudspeaker 406 and the like.

Figure 5D:
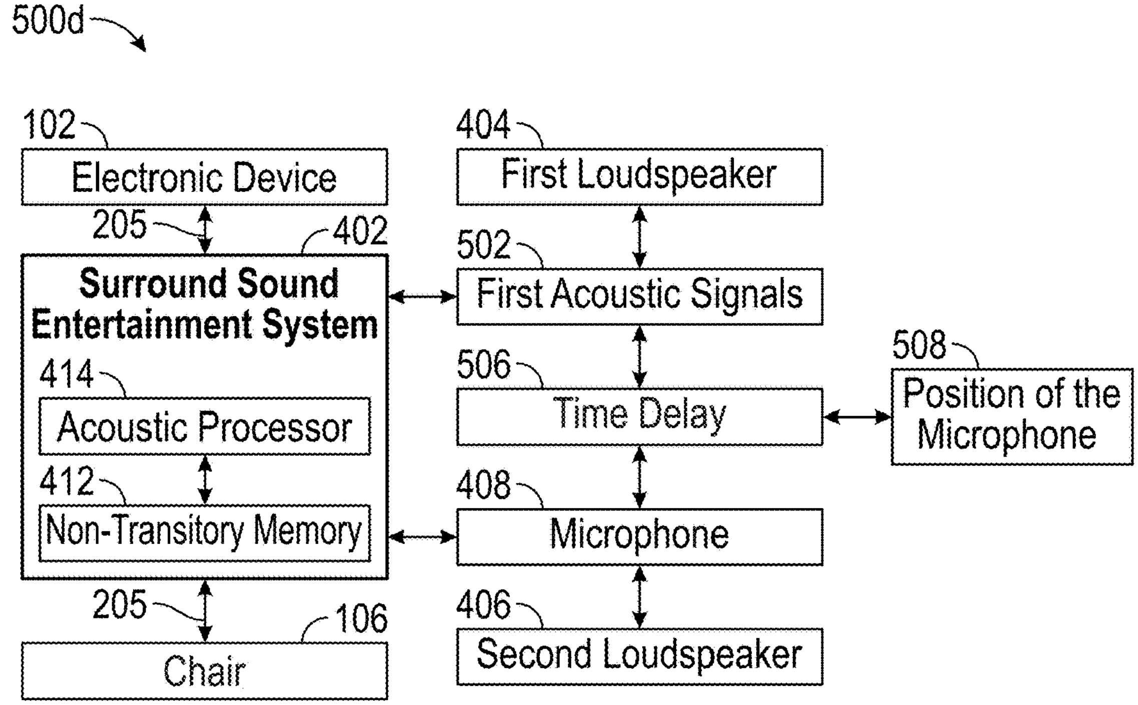
FIG. 5D is a block diagram depicting a schematic representation of the system for determining the position of the microphone relative to the first loudspeaker or the second loudspeaker using the time delay, in accordance with one or more exemplary embodiments.

FIG. 5D is a block diagram 500*d* depicting a system in which aspects of the present disclosure can be implemented. FIG. 5D depicts a schematic representation of the system for determining the position of the microphone relative to the first loudspeaker and/or the second loudspeaker using the time delay, in accordance with one or more exemplary embodiments. The diagram 500*d* includes the surround sound entertainment system 402, the first loudspeaker 404, the second loudspeaker 406, the first loudspeaker interface 410*a*, the second loudspeaker interface 410*b*, the display interface 410*d*, the wired/wireless network interface 205, the electronic device 102, the chair 106, the microphone interface 410*c*, and the microphone 408. The surround sound entertainment system 402 includes the acoustic processor 414, and the non-transitory memory 412, the first acoustic signal 502, the second acoustic signal 504, a time delay 506, and a position of the microphone 508.

The first loudspeaker interface 410*a* may be configured to send the first acoustic signals 502 to the first loudspeaker 404. The second loudspeaker interface 410*b* may be configured to send the second acoustic signals 504 to the second loudspeaker 406. The microphone interface 410*c* may be configured to receive microphone data from the microphone 408. The acoustic processor 414 may be configured to determine the time delay 506 between reproduction of the first acoustic signals 502 on the first loudspeaker 404 and reception of corresponding sound by the microphone 408 using the microphone data. The acoustic processor 414 may be configured to determine the position of the microphone 508 relative to the first loudspeaker 404 and/or the second loudspeaker 406 using the time delay 506.

Figure 5E:
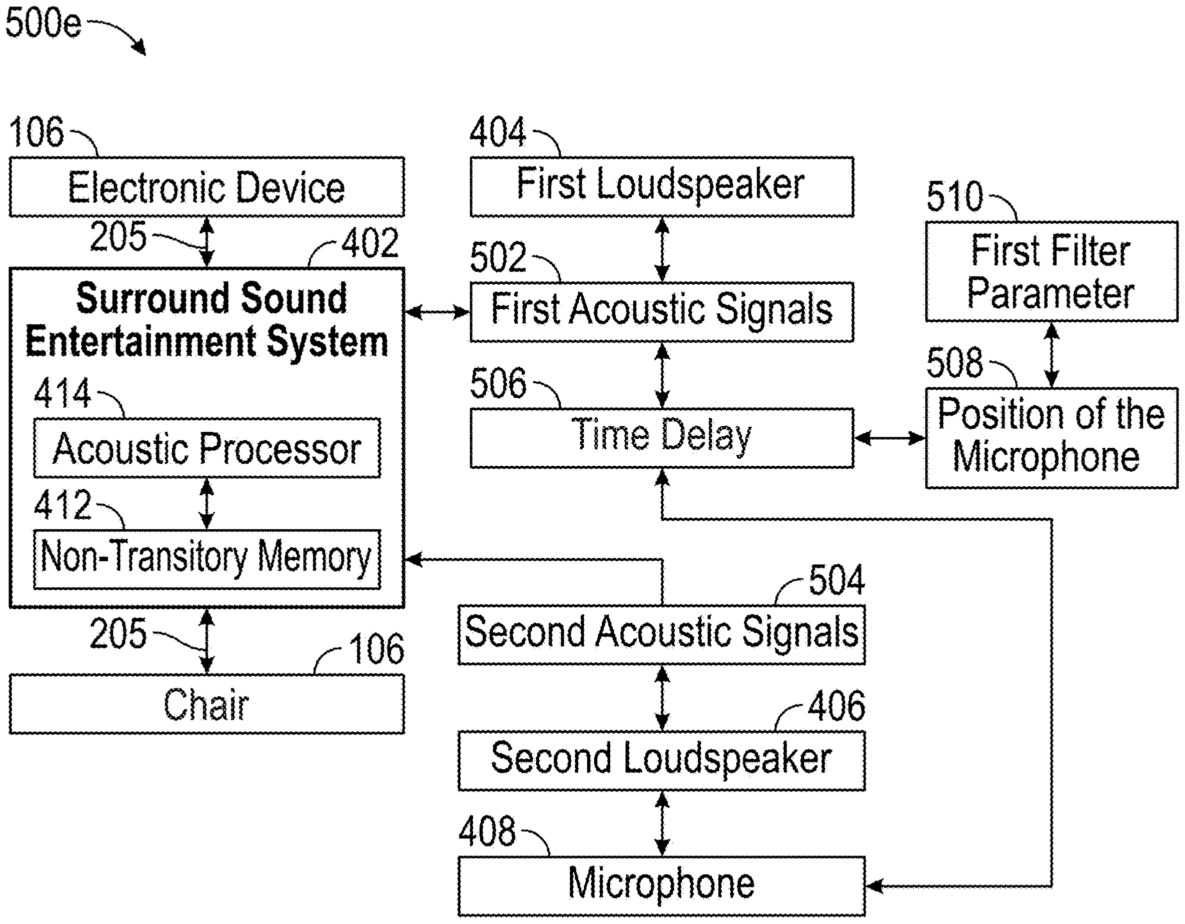
FIG. 5E is a block diagram depicting a schematic representation of the system for determining the first filter parameter based on the position of the microphone relative to the first loudspeaker or the second loudspeaker, in accordance with one or more exemplary embodiments.

FIG. 5E is a block diagram 500*e* depicting a system in which aspects of the present disclosure can be implemented. FIG. 5E depicts a schematic representation of the system for determining the first filter parameter based on the position of the microphone relative to the first loudspeaker or the second loudspeaker, in accordance with one or more exemplary embodiments. The diagram 500*e* includes the surround sound entertainment system 402, the first loudspeaker 404, the second loudspeaker 406, the electronic device 102, the chair 106, the microphone 408. The surround sound entertainment system 402 includes the acoustic processor 414, the non-transitory memory 412, the first acoustic signals 502, the second acoustic signals 504, the time delay 506, the position of the microphone 508, and a first filter parameter 510.

The first loudspeaker interface 410*a* may be configured to send the first acoustic signals 502 to the first loudspeaker 404. The second loudspeaker interface 410*b* may be configured to send the second acoustic signals 504 to the second loudspeaker 406. The microphone interface 410*c* may be configured to receive microphone data from the microphone 408.

The acoustic processor 414 may be configured to determine the time delay 424 between reproduction of the first acoustic signals 502 on the first loudspeaker 404 and reception of corresponding sound by the microphone 408 using the microphone data. The acoustic processor 414 may be configured to determine the position of the microphone 508 relative to the first loudspeaker 404 using the time delay 506.

The acoustic processor 414 may be configured to determine the first filter parameter 510 for reproducing the first acoustic signals 502 or the second acoustic signals 504 based on the position of the microphone 408 relative to the first loudspeaker 404 or the second loudspeaker 406. The acoustic processor 414 may be configured to reproduce the generated first acoustic signals 502 for reproducing a sound image on the first loudspeaker 404 at the target user position. The acoustic processor 414 may be configured to reproduce the generated second acoustic signals 504 for reproducing a sound image on the second loudspeaker 406 at the target user position.

Figure 6:
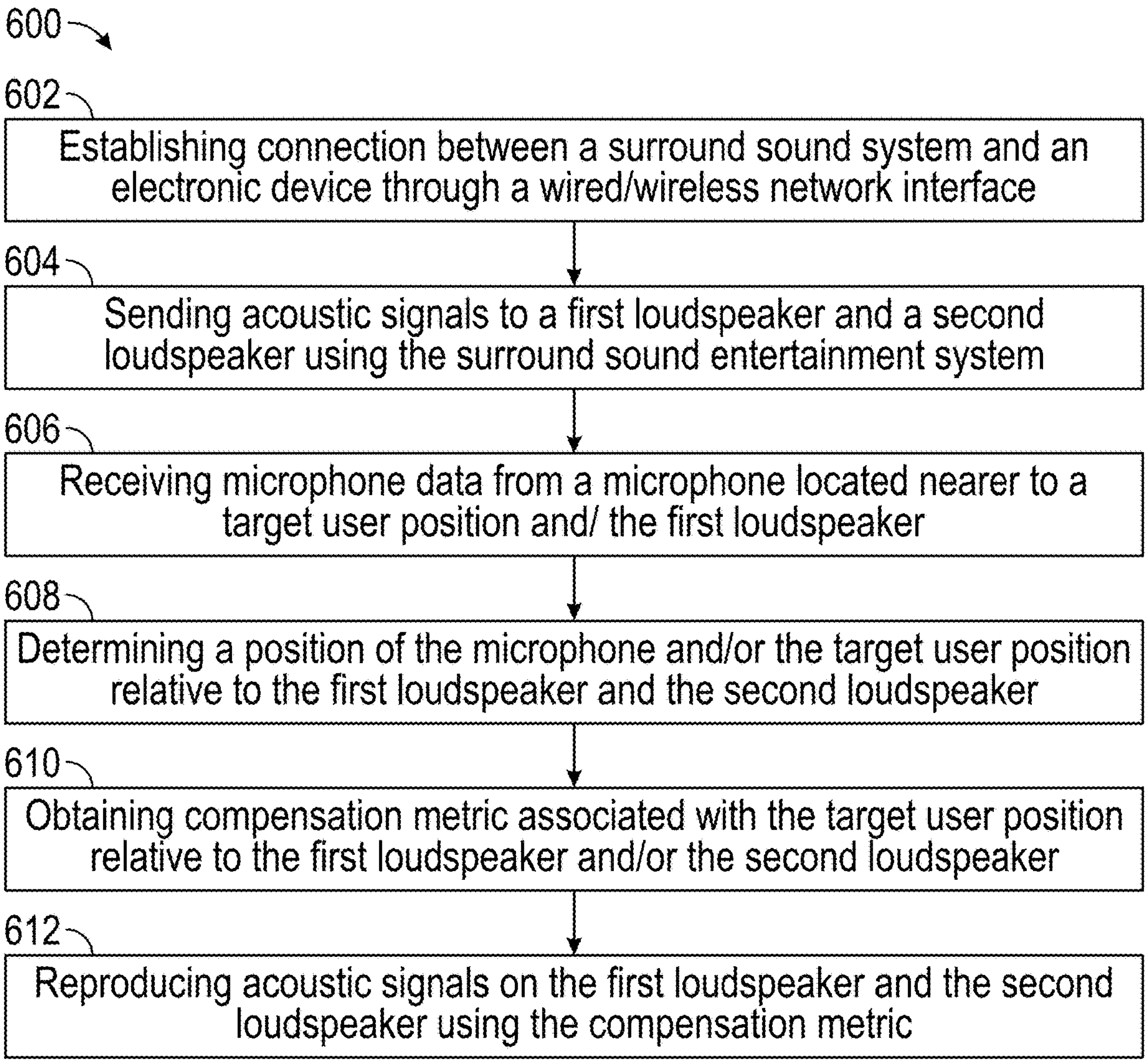
FIG. 6 is an example flow diagram depicting a method for reproducing acoustic signals on the first loudspeaker and the second loudspeaker using the compensation metric to provide the immersive surround sound experience, in accordance with one or more exemplary embodiments.

FIG. 6 is an example flow diagram 600 depicting a method for reproducing acoustic signals on the first loudspeaker and the second loudspeaker using the compensation metric to provide the immersive surround sound experience, in accordance with one or more exemplary embodiments. The method 600 may be carried out in the context of the details of FIG. 2A, FIG. 2B, FIG. 2C, FIG. 3A, FIG. 3B, FIG. 3C, FIG. 3D, FIG. 4, FIG. 5A, FIG. 5B, FIG. 5C, FIG. 5D, and FIG. 5E. However, the method 600 may also be carried out in any desired environment. Further, the aforementioned definitions may equally apply to the description below.

The method at step 602 includes establishing connection between the surround sound entertainment system and the electronic device through the wired/wireless network interface. At step 604, the method 700 includes sending acoustic signals to the first loudspeaker and the second loudspeaker using the surround sound entertainment system. At step 606, the method 700 includes receiving microphone data from the microphone located nearer to the target user and/or the first loudspeaker. At step 608, the method 700 includes determining a position of the microphone and/or the target user position relative to the first loudspeaker and the second loudspeaker. Thereafter at step 610, obtaining compensation metric associated with the target user position relative to the first loudspeaker or the second loudspeaker. At step 612, the method 700 includes reproducing acoustic signals on the first loudspeaker and the second loudspeaker using the compensation metric.

Figure 7:
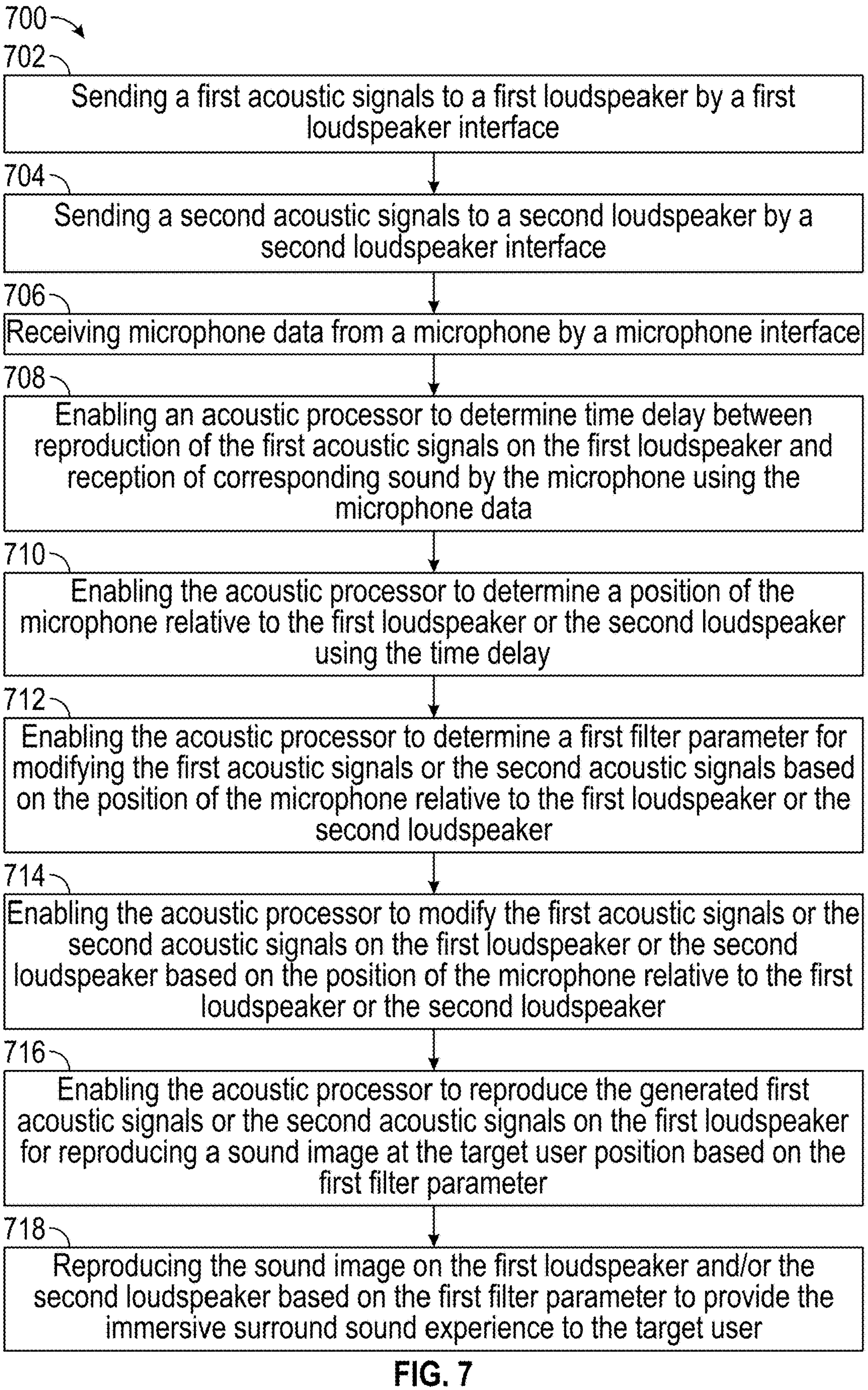
FIG. 7 is an example flow diagram depicting a method for identifying the first filter parameter and modifying the acoustic signals to reproduce the sound image on the first loudspeaker and/or the second loudspeaker to provide the immersive surround sound experience to the target user, in accordance with one or more exemplary embodiments.

FIG. 7 is an example flow diagram 700 depicting a method for identifying the first filter parameter and modifying the acoustic signals to reproduce the sound image on the first loudspeaker and/or the second loudspeaker to provide the immersive surround sound experience to the target user, in accordance with one or more exemplary embodiments. The method 700 may be carried out in the context of the details of FIG. 2A, FIG. 2B, FIG. 2C, FIG. 3A, FIG. 3B, FIG. 3C, FIG. 3D, FIG. 4, FIG. 5A, FIG. 5B, FIG. 5C, FIG. 5D, FIG. 5E, and FIG. 6. However, the method 700 may also be carried out in any desired environment. Further, the aforementioned definitions may equally apply to the description below.

The method 700 at step 702 includes sending the first acoustic signals to the first loudspeaker using the first loudspeaker interface. At step 704, the method 700 includes sending the second acoustic signals to the second loudspeaker using the second loudspeaker interface. At step 706, the method 700 includes receiving microphone data from the microphone through the microphone interface. At step 708, the method 700 includes enabling the acoustic processor to determine the time delay between reproduction of the first acoustic signals on the first loudspeaker and reception of corresponding sound by the microphone using the microphone data. At step 710, the method 700 includes enabling the acoustic processor to determine the position of the microphone relative to the first loudspeaker or the second loudspeaker using the time delay. At step 712, the method 700 includes enabling the acoustic processor to determine the first filter parameter for modifying the first acoustic signals or the second acoustic signals based on the position of the microphone relative to the first loudspeaker or the second loudspeaker. At step 714, the method 700 includes enabling the acoustic processor to modify the first acoustic signals or the second acoustic signals on the first loudspeaker or the second loudspeaker based on the position of the microphone relative to the first loudspeaker or the second loudspeaker. At step 716, the method 700 includes enabling the acoustic processor to reproduce the generated first acoustic signals or the second acoustic signals on the first loudspeaker or the second loudspeaker. At step 718, the method 700 includes reproducing the sound image on the first loudspeaker and/or the second loudspeaker at the target user position based on the first filter parameter to provide the immersive surround sound experience to the target user.

Figure 8:
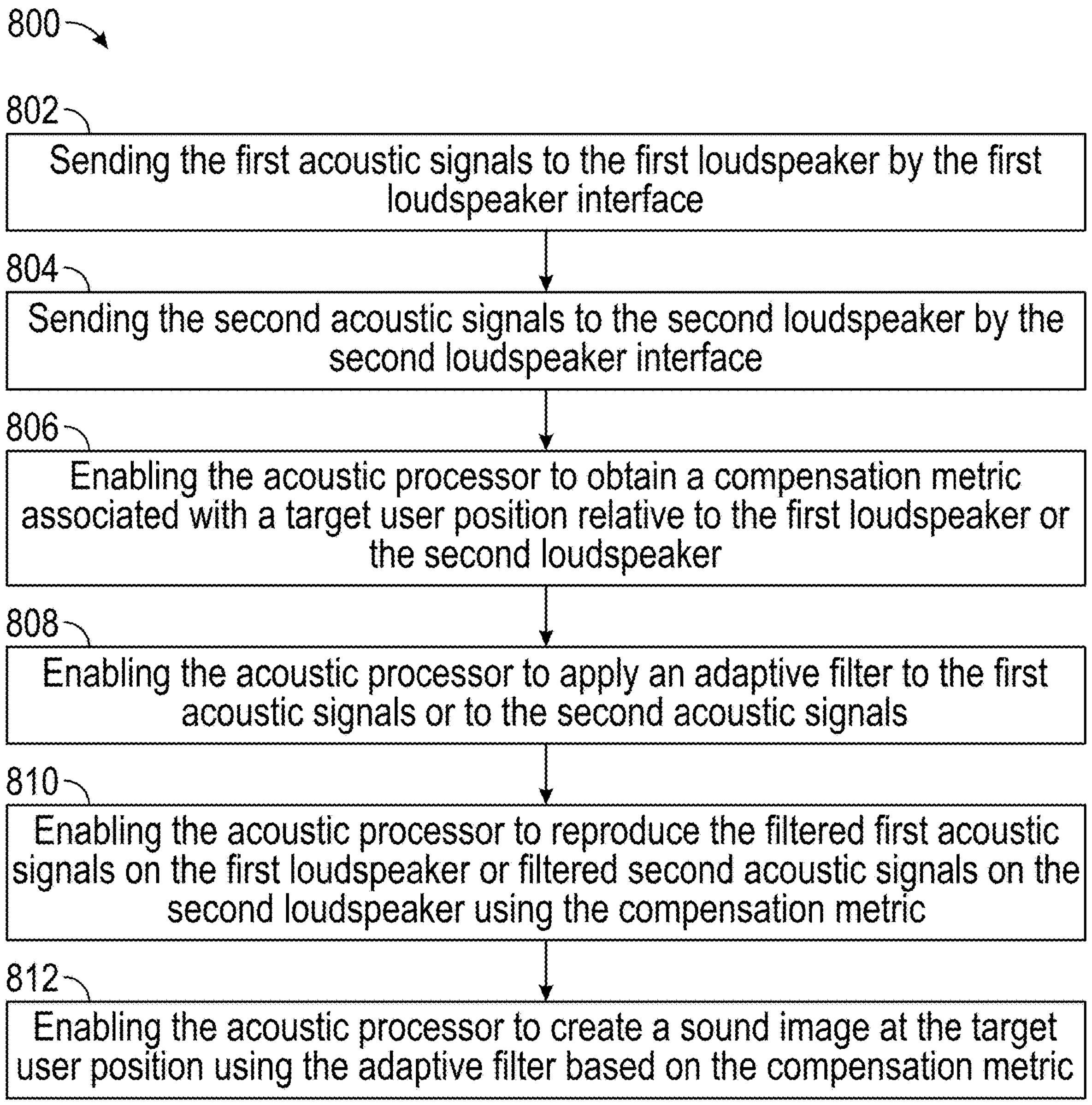
FIG. 8 is another example flow diagram depicting a method for applying adaptive filter and filtering acoustic signals to reproduce the sound image on the first loudspeaker and/or the second loudspeaker to provide the immersive surround sound experience to the target user, in accordance with one or more exemplary embodiments.

FIG. 8 is another example flow diagram 800 depicting a method for applying adaptive filter and filtering the acoustic signals to reproduce the sound image on the first loudspeaker and/or the second loudspeaker to provide the immersive surround sound experience to the target user, in accordance with one or more exemplary embodiments. The method 800 may be carried out in the context of the details of FIG. 2A, FIG. 2B, FIG. 2C, FIG. 3A, FIG. 3B, FIG. 3C, FIG. 3D, FIG. 4, FIG. 5A, FIG. 5B, FIG. 5C, FIG. 5D, FIG. 5E, FIG. 6, and FIG. 7. However, the method 800 may also be carried out in any desired environment. Further, the aforementioned definitions may equally apply to the description below.

The method at step 802 includes sending the first acoustic signals to the first loudspeaker by the first loudspeaker interface. At step 804, the method 700 includes sending the second acoustic signals to the second loudspeaker by the second loudspeaker interface. At step 806, the method 700 includes enabling the acoustic processor to obtain the compensation metric associated with the target user position relative to the first loudspeaker or the second loudspeaker. At step 808, the method 700 includes enabling the acoustic processor to apply the adaptive filter to the first or second acoustic signals. At step 810, the method 700 includes enabling the acoustic processor to reproduce the filtered first acoustic signals on the first loudspeaker or the filtered second acoustic signals on the second loudspeaker using the compensation metric. At step 812, the method 700 includes creating the sound image at the target user position by the adaptive filter based on the compensation metric.

Reference throughout this specification to “one embodiment”, “an embodiment”, or similar language means that a particular feature, structure, or characteristic described in connection with the embodiment is included in at least one embodiment of the present disclosure. Thus, appearances of the phrases “in one embodiment”, “in an embodiment” and similar language throughout this specification may, but do not necessarily, all refer to the same embodiment.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

Example Embodiments

Some non-limiting example embodiments are provided below:

In a 1st Example, a surround sound entertainment system is configured to determine a microphone position relative to a first loudspeaker, the system comprising: a first loudspeaker interface configured to send first acoustic signals to a first loudspeaker operatively coupled to a display interface; a second loudspeaker interface configured to send second acoustic signals to a second loudspeaker; a microphone interface configured to receive microphone data from a microphone; an acoustic processor configured to generate an acoustic signal output to each of the first and second loudspeakers; and a non-transitory memory comprising instructions executable by the acoustic processor, wherein the instructions, when executed by the acoustic processor, cause the system to: receive the microphone data via the microphone interface; determine, using the microphone data, a time delay between reproduction of the first acoustic signals on the first loudspeaker and reception of corresponding sound by the microphone; determine, using the time delay, a position of the microphone relative to the first loudspeaker; and determine, based on the position of the microphone relative to the first loudspeaker, a first filter parameter for modifying at least one of the first acoustic signals or the second acoustic signals.

In a 2nd Example, the surround sound entertainment system of Example 1, wherein determining the position of the microphone relative to the first and second loudspeakers comprises determining a target user position.

In a 3rd Example, the surround sound entertainment system of Example 2, wherein determining the target user position comprises obtaining a distance between the microphone and the target user position.

In a 4th Example, the surround sound entertainment system of Example 3, wherein the distance is less than 50 cm.

In a 5th Example, the surround sound entertainment system of any of Examples 2-4, wherein the second loudspeaker is operatively connected to the target user position.

In a 6th Example, the surround sound entertainment system of Example 5, wherein the second loudspeaker is separated from the microphone by a minimum distance.

In a 7th Example, the surround sound entertainment system of Example 6, wherein the minimum distance is less than 75 cm.

In a 8th Example, the surround sound entertainment system of any of Examples 5-7, wherein determining the first filter parameter for modifying the at least one of the first acoustic signals or the second acoustic signals comprises determining the first filter parameter for modifying the first acoustic signals.

In a 9th Example, the surround sound entertainment system of Example 8, wherein determining the first filter parameter for modifying at least one of the first acoustic signals or the second acoustic signals further comprises determining the first filter parameter for modifying the second acoustic signals.

In a 10th Example, the surround sound entertainment system of Example 9, wherein the instructions, when executed by the acoustic processor, further cause the system to: generate, based on the first filter parameter, an acoustic signal for reproducing on the first loudspeaker a sound image at the target user position.

In a 11th Example, the surround sound entertainment system of Example 10, wherein the instructions, when executed by the acoustic processor, further cause the system to: reproduce, using the acoustic processor, the generated first acoustic signal on the first loudspeaker.

In a 12th Example, the surround sound entertainment system of Example 11, wherein the instructions, when executed by the acoustic processor, further cause the system to: generate, based on the first filter parameter, a second acoustic signal for reproducing on the second loudspeaker the sound image at the target user position; and reproduce, using the acoustic processor, the generated second acoustic signal on the second loudspeaker.

In a 13th Example, the surround sound entertainment system of any of Examples 1-12, wherein the first loudspeaker is operatively coupled to the display interface.

In a 14th Example, the surround sound entertainment system of any of Examples 1-13, wherein the microphone is disposed nearer to a target user position than to the first loudspeaker.

In a 15th Example, a surround sound entertainment system configured to apply an adaptive filter to first acoustic signals or to second acoustic signals, the system comprising: a first loudspeaker interface configured to send the first acoustic signals to a first loudspeaker operatively coupled to a display interface; a second loudspeaker interface configured to send the second acoustic signals to a second loudspeaker; an acoustic processor configured to generate an acoustic signal to each of the first and second loudspeakers; and a non-transitory memory comprising instructions executable by the acoustic processor, wherein the instructions, when executed by the acoustic processor, cause the system to: obtain a compensation metric associated with a user position relative to the first loudspeaker or the second loudspeaker; apply an adaptive filter to the first acoustic signals or to the second acoustic signals, wherein the adaptive filter is based on at least the compensation metric, and wherein the adaptive filter is configured to create a sound image at a target user position; reproduce, using the compensation metric, filtered first acoustic signals on the first loudspeaker or filtered second acoustic signals on the second loudspeaker.

In a 16th Example, the surround sound entertainment system of Examples 15, further comprising a microphone interface configured to receive microphone data from a microphone disposed nearer to the target user position than to the first loudspeaker.

In a 17th Example, the surround sound entertainment system of Examples 16, further comprising the first and second loudspeakers and the microphone.

In a 18th Example, the surround sound entertainment system of Examples 17, wherein the instructions, when executed by the acoustic processor, cause the system to: determine the position of the microphone relative to the first and second loudspeakers.

In a 19th Example, the surround sound entertainment system of Examples 18, wherein determining the position of the microphone comprises determining the target user position.

In a 20th Example, the surround sound entertainment system of Examples 19, wherein determining the target user position comprises obtaining a distance between the microphone and the target user position.

In a 21st Example, the surround sound entertainment system of Examples 20, wherein the second loudspeaker is operatively connected to the target user position.

In a 22nd Example, the surround sound entertainment system of Examples 21, wherein the second loudspeaker is separated from the microphone by a minimum distance.

In a 23rd Example, the surround sound entertainment system of any of Examples 14-22, wherein obtaining the compensation metric associated with the user position relative to the first loudspeaker or the second loudspeaker comprises determining the compensation metric.

CONCLUSION

Reference throughout this specification to "some embodiments" or "an embodiment" means that a particular feature, structure, or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment. Accordingly, no feature or group of features is necessary or indispensable to each embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. An entertainment system, the system comprising:
an acoustic processor configured to generate an acoustic signal to a loudspeaker; and
a non-transitory memory comprising instructions executable by the acoustic processor, wherein the instructions, when executed by the acoustic processor, cause the system to:
obtain a compensation metric associated with a user position relative to the loudspeaker;
apply an adaptive filter to the acoustic signals, wherein the adaptive filter is based on at least the compensation metric, and wherein the adaptive filter is configured to create a sound image at a target user position; and
reproduce, using the compensation metric, filtered acoustic signals on the loudspeaker.

2. The entertainment system of claim 1, further comprising a microphone interface configured to receive microphone data from a microphone disposed nearer to the target user position than to the loudspeaker.

3. The entertainment system of claim 2, further comprising the loudspeaker and the microphone.

4. The entertainment system of claim 3, wherein the instructions, when executed by the acoustic processor, cause the system to:
determine the position of the microphone relative to the loudspeaker.

5. The entertainment system of claim 4, wherein determining the position of the microphone comprises determining the target user position.

6. The entertainment system of claim 5, wherein determining the target user position comprises obtaining a distance between the microphone and the target user position.

7. The entertainment system of claim 6, further comprising a second loudspeaker operatively connected to the target user position.

8. The entertainment system of claim 7, wherein the second loudspeaker is separated from the microphone by a minimum distance.

9. The entertainment system of claim 1, wherein obtaining the compensation metric associated with the user position relative to the loudspeaker comprises determining the compensation metric.

* * * * *